United States Patent

Donoghue

[15] 3,673,430
[45] June 27, 1972

[54] COS/MOS PHASE COMPARATOR FOR MONOLITHIC INTEGRATION

[72] Inventor: William J. Donoghue, Somerset, N.J.
[73] Assignee: The United States of America as represented by the Secretary of the Air Force
[22] Filed: Aug. 23, 1971
[21] Appl. No.: 173,896

[52] U.S. Cl..............................307/232, 307/228, 307/246, 307/297, 307/304, 328/133, 328/151
[51] Int. Cl........................................................H03d 13/00
[58] Field of Search..................307/228, 232, 246, 251, 297, 307/304; 328/133, 134, 151, 155

[56] References Cited
UNITED STATES PATENTS 3,495,096   2/1970   Blachowicz et al.................328/133 X
3,521,084   7/1970   Jones....................................307/232
3,575,665   4/1971   Honma.............................307/232 X Primary Examiner—Donald D. Forrer
Assistant Examiner—R. C. Woodbridge
Attorney—Harry A. Herbert, Jr. et al.

[57] ABSTRACT

A phase comparator integrated circuit apparatus for comparing a pair of AC signals and providing a substantially pure DC output. The phase converter utilizes the time difference between pulses from two different input signals to provide a DC voltage which is free from AC ripple.

3 Claims, 3 Drawing Figures

÷R SIGNAL (REFERENCE)

RAMP WAVEFORM

÷N SIGNAL (SAMPLE)

WAVEFORM AT $C_2$

WAVEFORM AT $C_3$

COS/MOS PHASE COMPARATOR FOR MONOLITHIC INTEGRATION

BACKGROUND OF THE INVENTION

The present invention relates broadly to a phase comparator apparatus and in particular to a MOS integrated circuit phase comparator providing a substantially pure DC output signal from a pair of input AC signals.

Conventional prior art phase detectors to provide phase comparisons between alternating current signals exist in many forms. Since the comparison that is required is between alternating current signals and, in general, the primary interest exists in a pure DC voltage which is proportional to the phase difference between the two input signals, the magnitude of the AC ripple in the output of the phase detector which is caused by the input signals, creates a problem that is not easily eliminated. To reduce frequency modulation of the output signal present frequency synthesizer subsystems require filtering on the output of the standard phase comparators use in their phase-locked loop. This filtering is harmful to the operation of the frequency synthesizer in that it reduces the frequency response of the loop. One object of this invention is to reduce the output noise of the phase comparator so as to eliminate as much filtering as possible and still maintain an acceptable amount of incidental frequency modulation. The present invention is intended for use in a phase-locked loop of a frequency synthesizer which controls a voltage controlled oscillator.

Among the primary requirements for operation in such a critical loop are that the phase comparator be capable of producing a very pure DC voltage output and a wide swing in the output voltage. The primary reason for these particular requirements is to enable the circuit to provide a stable fixed frequency output from the voltage controlled oscillator for a fixed DC input voltage. Any AC ripple that may be present in the DC input voltage from the phase comparator would result in an undesired frequency modulation condition. Additionally, a wide output voltage swing from the phase comparator is necessary to bring the phase-locked loop into lock. The approach which would provide the purest DC voltage output was a sampling and hold technique. Usually in other techniques of phase comparison some amplification is required to produce enough output voltage swing. Thus, in amplifying the output signal, the AC ripple is also amplified. The present invention avoids the common pitfalls which are encountered in the prior art devices. Further, an all MOS approach has been utilized since it is a low gain application, and the COS/MOS sampling gates are ideal for the sampling and hold process.

SUMMARY OF THE INVENTION

The present invention utilizes a sample and hold technique to provide a phase comparator integrated circuit apparatus with a DC voltage output that is free from AC ripple. One input alternating current signal ( R) is used to generate a ramp waveform while the other signal ( N) is used to sample this ramp, and the sampled voltage relative to their phase difference is maintained on storage devices. The time difference between the pulses from the two difference input signals is applied to an amplifier stage to provide a DC voltage output which is proportional to the time difference.

It is one object of the invention, therefore, to provide an improved integrated circuit phase comparator apparatus utilizing sample and hold circuitry to determine the phase difference between a pair of alternating current input signals.

It is another object of the invention to provide an improved integrated circuit phase comparator apparatus having a substantially pure DC voltage output which is free from AC ripple.

It is yet another object of the invention to provide an improved integrated circuit phase comparator apparatus having a wide output voltage swing to bring the phase-locked loop into lock.

These and other advantages, objects and features of the invention will become more apparent from the following detailed description when taken in conjunction with the illustrative embodiment in the accompanying drawings.

DESCRIPTION OF PREFERRED EMBODIMENT

Figure 1:
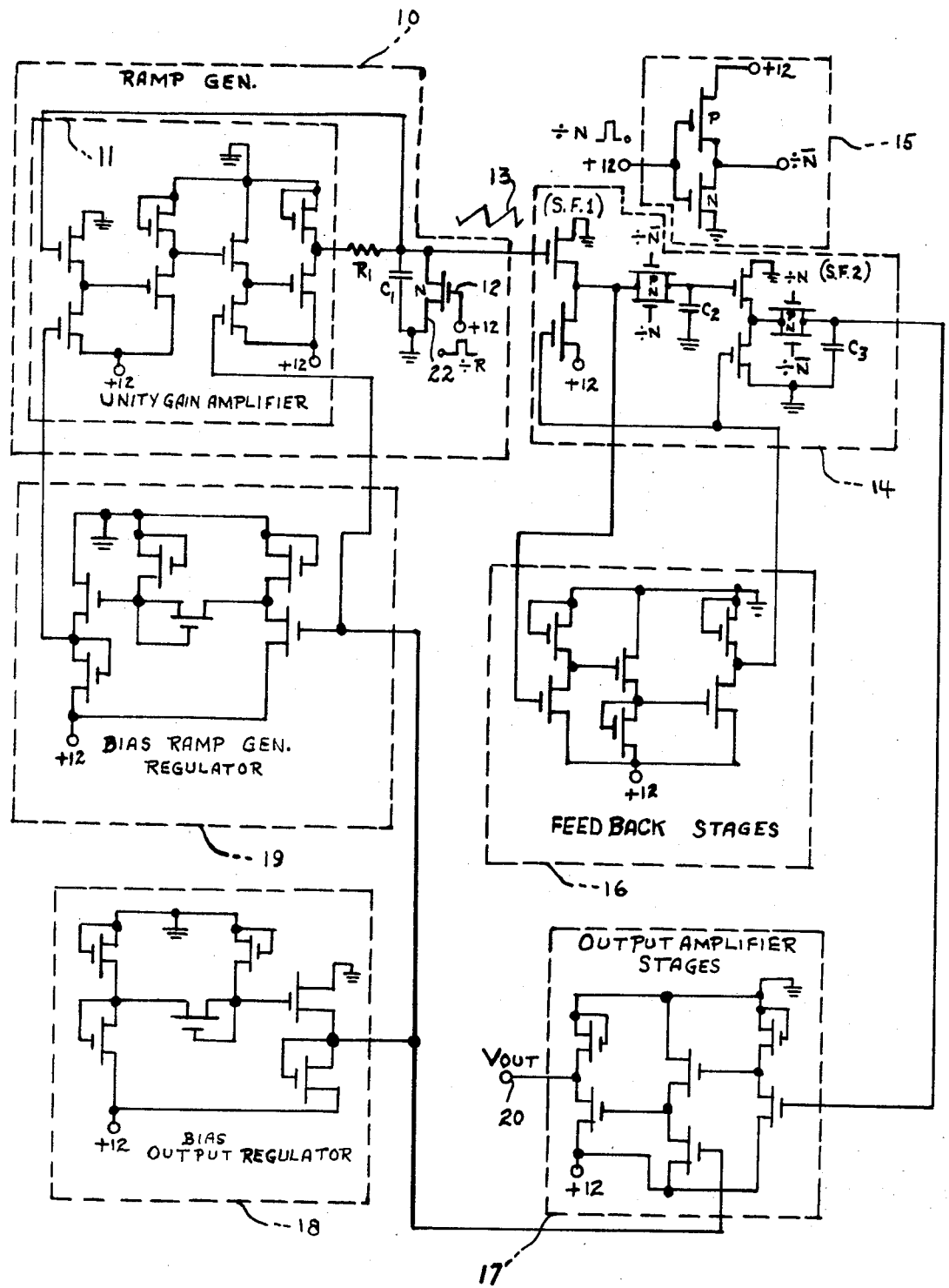
FIG. 1 is a schematic diagram of the integrated circuit phase comparator apparatus in accordance with this invention.

Referring now to FIG. 1, there is shown a phase comparator apparatus having a ramp generator 10 which is comprised of a unity gain amplifier 11 and a triggering means 12 to provide a voltage ramp output signal 13. A sample and hold circuit 14 is connected to the ramp generator 10 to receive the voltage ramp output signal 13 which was generated by a first alternating current signal, R. A second alternating current signal, N, is applied to an inverter circuit 15 to obtain the complementary signal, $\bar{N}$. Both signals, N and $\bar{N}$, are utilized in the sample and hold circuit 14 to sample the voltage ramp output signal 13. The feedback stages 16 receive and amplify the ramp signal 13 which is then applied to the sample and hold circuit 14 at source follower stages, S.F.1, S.F.2. The DC output voltage of the sample and hold circuit 14 is applied to the output amplifier unit 17 to be amplified prior to use in the frequency synthesizer (not shown). The pure DC output voltage appears at terminal 20. A bias output regulator provides control signals to the output amplifier unit 17, the bias ramp generator regulator unit 19 and the ramp generator unit 10. The bias ramp generator regulator unit 19 provides an additional control signal to the ramp generator unit 10.

Figure 1A:
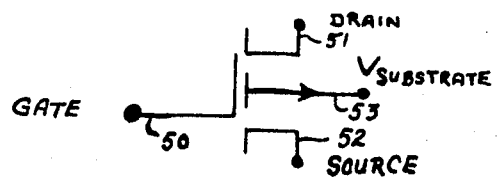
FIG. 1a is a schematic diagram of a p-channel MOSFET transistor.
Figure 2:
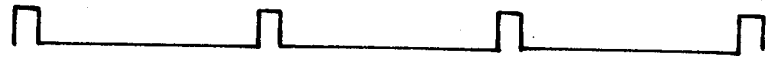
FIG. 2 is a graphical representation of the waveforms which are utilized within the phase comparator apparatus.
Figure 2:
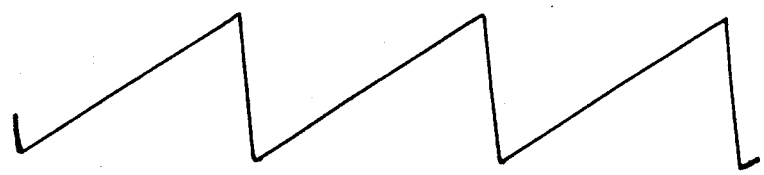
Figure 2:
Figure 2:
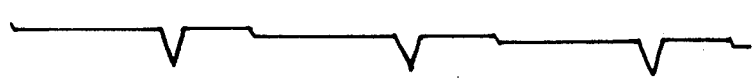
Figure 2:

The present invention may be used in a phase-locked loop of a frequency synthesizer where it controls a voltage controlled oscillator. The primary requirements are that the phase comparator produce a very pure DC output and have a wide swing in output voltage. The reason for these requirements are that the circuit should produce a fixed frequency output from the voltage controlled oscillator for a fixed DC voltage, and any AC ripple from the phase comparator would result in frequency modulation. A wide output voltage swing is required to bring the phase locked loop into lock. The complete phase comparator circuit may be implemented by using 39 P-channel devices and four N-channel devices as is shown in simplified form in FIG. 1. FIG. 1a illustrates a P-channel MOSFET transistor having a gate 50, a drain 51, a substrate contact 53 and a source 52. In the phase comparator circuit the source of a transistor is usually most positive. The circuit operates as follows. The first signal, R is applied to the ramp generator 10 and triggers a ramp 13 (shown in detail in FIG. 2). The ramp voltage is then sampled through a COS/MOS sampling gate by the second signal, N, and this sampled voltage is held on capacitor $C_2$. The signal appearing on $C_2$ is sampled after the first sampling gate opens (180° out of phase) and the resulting voltage is held on capacitor $C_3$. This double sampling helps to eliminate some of the N and ramp signal feedthrough in the waveforms at capacitors $C_2$, $C_3$ which are shown in FIG. 2. The greater the time difference between the R and N signals, the higher the DC output voltage of the circuit. The capacitors, $C_1$ and $C_3$ are external components to the integrated circuit phase comparator.

The ramp generator 10 is a bootstrap sweep circuit. Capacitor $C_1$ is discharged to ground by the R signal through an N-channel device, 22, then it is allowed to charge back toward +12V through an external resistor, $R_1$. A constant current is used to charge capacitor $C_1$ since a constant voltage is maintained across resistor $R_1$ by positive feedback through unity gain MOS amplifier 11. The output voltage of the amplifier is independent of any mobility variations, therefore, the ramp generator 10 output should not vary with mobility. The unity gain amplifier 11 output depends only on the width to length ratios of devices. The COS/MOS sampling gates help to eliminate any pulse feedthrough by making the gate-to-source capacitance of the N- and P-channel units equal. The capacitor $C_3$ is much larger than capacitor $C_2$ in this application, since capacitor $C_2$ must charge quickly and capacitor $C_3$ has the remainder of the cycle to charge. There is some ramp voltage feedthrough which appears on capacitor $C_2$ (through the open COS/MOS gates). The feedback stages 16 help to eliminate this feedthrough (which would cause AC ripple) by degeneratively feeding back some of the ramp voltage waveform. The feedback stages 16 also provide a DC bias for the two source follower stages (S.F.1 and S.F.2). The output stages 17 provide some amplification to produce the output voltage swing which is required in the frequency synthesizer application.

The two biasing regulator networks 18,19 provide $V_T$ threshold voltage regulation (and $\Delta V_T$ correction) for the ramp generator 10 and the output amplifier stages 17. The $\Delta V_T$ threshold regulation can be varied by changing the width-to-length ratios between devices in the level shifting sections of each regulator. Computer design was used for the $\Delta V_T$ correction. A zener diode and some filtering (not shown) may be used on the +12 volt supply to maintain the DC level of the output independent of supply voltage and present any noise feedthrough from the supply. The circuit exhibits a 7 volt output swing (for a +12V supply) for 360° phase change between R and N, and will operate over a frequency change of 600 Hz and 50 Kc.

While in accordance with the provisions of the statutes, I have illustrated and described the best forms of the invention now known to me, it will be apparent to those skilled in the art that changes may be made in the form of the apparatus disclosed without departing from the spirit of the invention as set forth in the appended claims, and that in some cases certain features of the invention may be used to advantage without a corresponding use of other features.

I claim:

1. An integrated circuit phase comparator apparatus for comparing a pair of AC signals and producing a DC output voltage comprising in combination:
   a ramp generator to provide a ramp output voltage, said ramp generator receiving a first AC signal, said ramp generator generating said ramp output voltage in response to said first AC signal,
   a sample and hold circuit to receive said ramp output voltage, said sample and hold circuit utilizing a second AC signal to sample said ramp output voltage, said sampled output voltage being stored in a first capacitor, said sampled output voltage being sampled by the complement of said second AC signal, said doubly sampled output voltage being stored in a second capacitor,
   a feedback circuit to receive said ramp output voltage from said sample and hold circuit, said feedback circuit degeneratively feeding back a portion of said ramp output voltage to said sample and hold circuit,
   an output amplifier unit receiving said output voltage from said second capacitor, said output amplifier unit amplifying said output voltage to provide a DC output voltage signal,
   a bias ramp generator regulator to provide threshold voltage regulation to said ramp generator, and,
   a bias output regulator to provide threshold voltage regulation to said output amplifier unit, said bias ramp generator regulator and said ramp generator.

2. An integrated circuit phase comparator apparatus as described in claim 1 wherein said ramp generator comprises:
   a unity gain amplifier to provide a constant voltage across a resistor by positive feedback through said unity gain amplifier, said constant voltage across said resistor provide a constant current, said constant current charges a third capacitor, said third capacitor is discharged to ground by said first AC signal through an N-channel device to provide said ramp output voltage.

3. An integrated circuit phase comparator apparatus as described in claim 1 wherein said sample and hold circuit comprises:
   a first source follower circuit which comprises:
   a pair of P-channel devices connected in series between ground and +12 volts supply,
   a N-channel device connected in parallel with a P-channel device to receive said ramp output voltage from said P-channel device pair, said N-channel device receiving said second AC signal and said P-channel device receiving said second AC signal complement to charge said first capacitor, and
   a second source follower circuit which comprises:
   a pair of P-channel devices connected in series between ground and +12 volts supply,
   a N-channel device connected in parallel with a P-channel device to receive said sampled output voltage from said first capacitor, said N-channel device receiving said second AC signal complement and said P-channel device receiving said second AC signal to charge said second capacitor.

* * * * *